April 30, 1946. E. I. POLLARD 2,399,381
SHIP PROPULSION CONTROL
Filed March 19, 1942 2 Sheets-Sheet 1

WITNESSES:
Robert C. Baird
Wm. C. Groovue

INVENTOR
Ernest I. Pollard.
BY
Paul E. Friedemann
ATTORNEY

Patented Apr. 30, 1946

2,399,381

UNITED STATES PATENT OFFICE 2,399,381

SHIP PROPULSION CONTROL

Ernest I. Pollard, Wilkinsburg, Pa., assignor to Westinghouse Electric Corporation, East Pittsburgh, Pa., a corporation of Pennsylvania Application March 19, 1942, Serial No. 435,389

18 Claims. (Cl. 172—8)

My invention relates to ship propulsion systems and, more particularly, to electric ship propulsion systems utilizing a plurality of generators and prime movers therefor, in which all of the generators are arranged to supply energy, either in combination or singly, to one or any one of each of the single synchronous motors, or induction motors, each coupled to drive a ship propeller.

This use of a plurality of generators and a plurality of prime movers is found most often where the ship is Diesel engine driven. At forced draft, or for other reasons, all generators are used, whereas when the ship is merely cruising, and thus to operate at a considerably lower speed, only one, or some, of the whole group is used. Thus, for increasing the speed, it is necessary to connect the idle generators to also supply energy to the system.

To effect this change of connection without disturbing the system, consisting of two or more generators and the propeller motor, or motors, as the case may be, by high current surges, various schemes have heretofore been proposed, but none of these schemes is as effective as the schemes I have devised.

It is a broad object of my invention to provide, in a ship propulsion system of the type mentioned, for the addition of one or more generators to the supply for the system without the use of complicated and expensive synchronizing equipment.

Another object of my invention is the provision of methods of adding generators to ship propulsion systems that are extremely simple and yet avoid the excessive current surges that the addition of idle generators to the system would normally cause.

Figure 1:
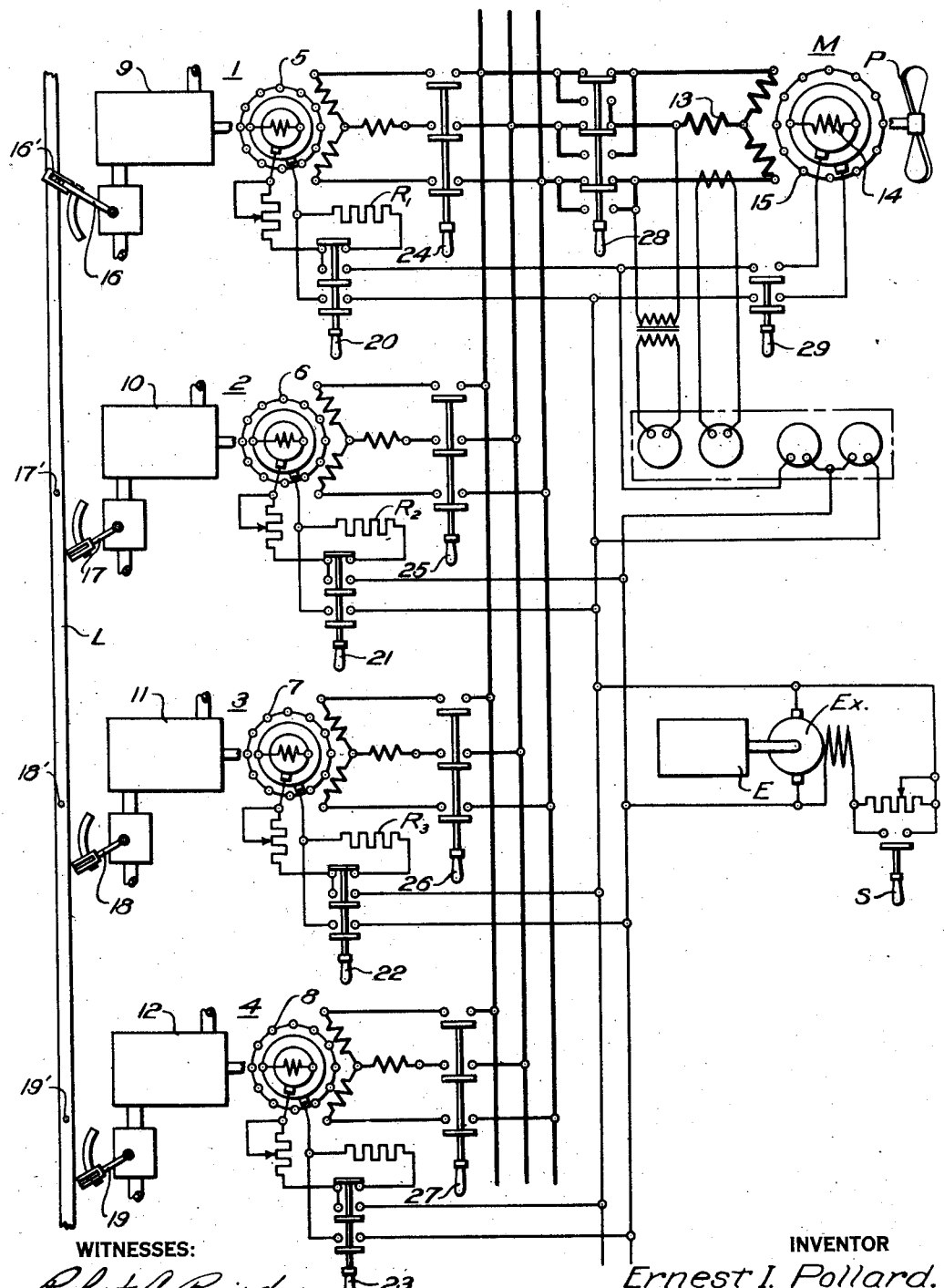
Figure 2:
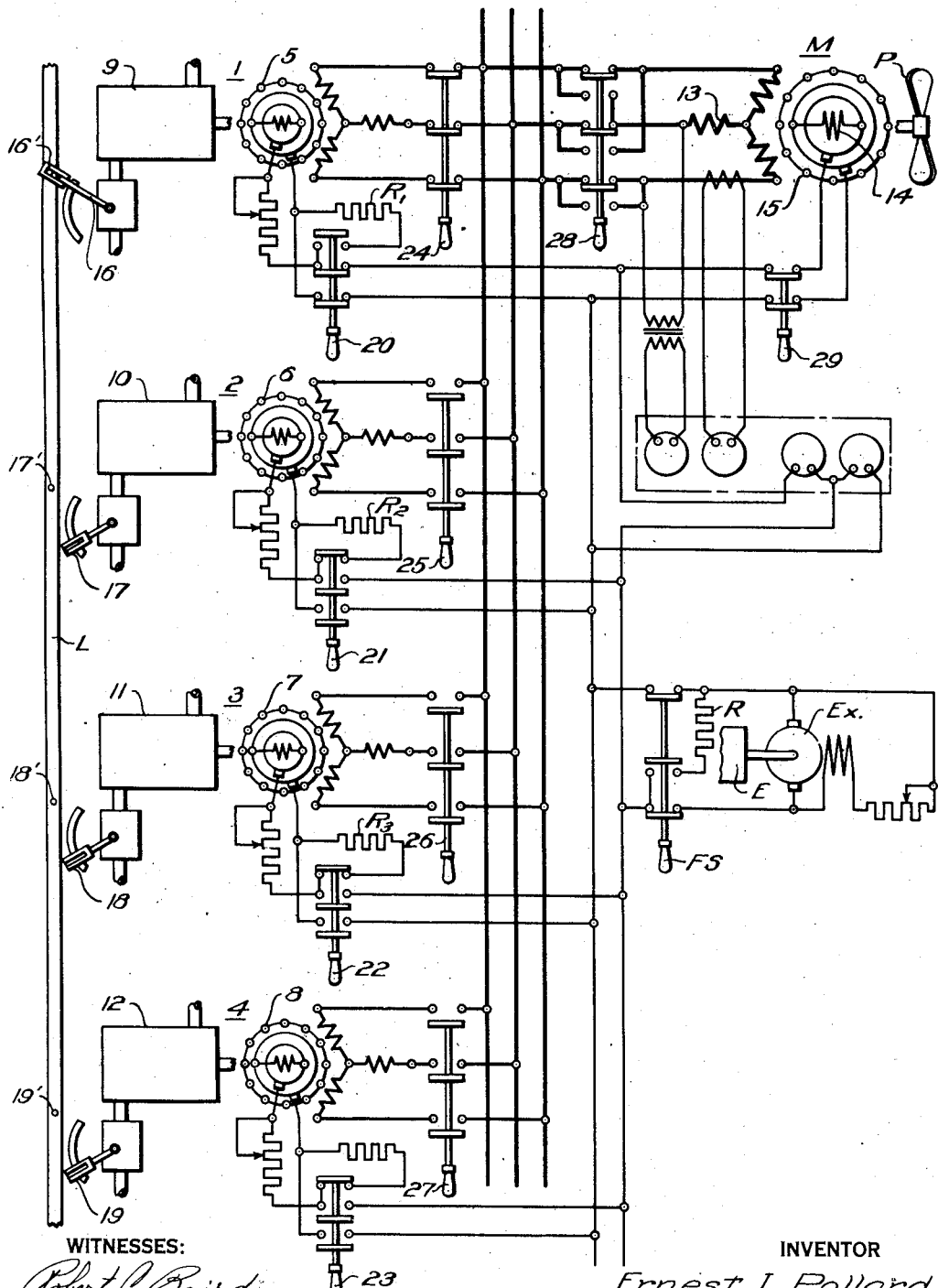

Other objects and advantages will become more apparent from a study of the following specification when studied in conjunction with the accompanying drawings, in which:

Figure 1 is a diagrammatic showing of a ship propulsion system embodying my invention; and Fig. 2 is a diagrammatic showing of a modification of my invention.

With my system, I utilize a plurality of generators as 1, 2, 3, and 4, all provided with low resistance damper windings as 5, 6, 7, and 8 to give a high pull-in torque when operating, or starting, as an induction motor. Without for the moment referring to the novel procedure of starting discussed later, the generators may be started as conventional synchronous motors by first accelerating them as induction motors and then, by applying excitation, synchronize them to thus operate them as conventional synchronous motors.

Each generator is driven by its own prime mover as a Diesel engine or turbine. The Diesel engines shown are designated, respectively, by reference characters 9, 10, 11, and 12. The single motor M, for driving the ship propeller P, is usually of the synchronous type having a stator winding 13, a field winding 14 and a starting, or damper, winding 15. The motor M may, of course, be an induction motor. An exciter Ex, of sufficient capacity to be able to simultaneously over-excite the field windings of all the machines when such over-excitation should be necessary, is driven at constant speed by a suitable engine or motor E, and provides the excitation for all the generators and all the motors, if there should be more than one propeller for the ship.

It is well known that the power required to drive a ship through the water rises with a higher power of the speed, possibly the cube of the speed. This means, if the maximum economics are to be realized, one or only some of the generators are needed for the lower speeds, whereas all the generators are needed for the higher speeds.

In an actual installation made on the submarine tender AS-12, U. S. S. *Sperry*, four Diesel generators for one motor coupled to a propeller were considered sufficient. The capacity of the motor was, of course, selected to effect proper driving of the propeller and the four generators used were selected to have a total capacity equal to that of the motor.

In an alternating-current drive of this type of ship propulsion, it is necessary to have simple means of paralleling the generators when an additional generator is to be added to the system. The conventional synchroscope method or a lamp method may be used, but these methods involve undesirable amounts of control equipment, and further there is a loss of time in adjusting the engine speeds and voltages. These methods would be particularly difficult to practice in a seaway where the torque input required by the propeller, and consequently the generator speed and voltage are continually varying.

With one of my simple schemes of adding a generator, assuming generator 1 is already supplying the motor M at full generator load corresponding to reduced generator speed and corresponding generator voltage, the incoming generator, as 2, is first brought up to the speed of the generator 1 already supplying motor M. This is best accomplished by bringing lever 17 to the same speed position held by lever 16, and then throwing the latch of lever 17 over pin 17' to thus interlock the speed levers of both engines. Operation of main speed lever L will thus simultaneously adjust the speed of both engines 9 and 10.

For the assumptions made, switches 20, 24, and 29 will be in the upper, or actuated, position. Switch 28 will be in the position shown. Before the speed of engine 10 is increased, care is taken that switch 21 is in the position shown. This means that the field winding of generator 2 will be shorted through resistor $R_2$. After the speed lever 17 is interlocked with speed lever 16, main lever L is moved down just sufficient to permit the ship to coast, and thus requiring practically no transmission of torque and at substantially the same time, or preferably a moment later, switch 25 is closed. The generator 2 being practically at synchronous speed as a result of the speed adjustment of engine 10, and since the field excitation of generator 1 and motor M is not altered, the system torque margin under this condition is sufficient to absorb the shock of the connection of the incoming generator to the system, and there is no loss of synchronism.

For the moment generator 2 operates as an induction motor on the short-circuited field winding and the low resistance damper winding 6. As soon as the current surge of adding this generator 2, which current surge will be small and of rather short duration, has decayed sufficiently, switch 21 is moved to its actuated, or upper, position, thus applying field excitation to generator 2 to positively synchronize it with generator 1 and the motor M. Synchronization of generator 2 thus occurs almost instantaneously. The main lever L may now be moved to any speed desired, but preferably to a position required by the need for adding a generator.

Adding of the other generators, as 3 and 4, is accomplished in the same manner, care being taken that speed levers 18 and 19 and switches 22 and 26 and 23 and 27 are operated in the proper sequence.

An alternate procedure of paralleling propulsion generators to that described above is as follows: Assuming that both generators 1 and 2 are operating at full speed, full load, and full voltage, that is, switches 20, 21, 24, 25, 28, and 29 are closed and speed levers 16 and 17 are interlocked on main lever L. To add generator 3, the speed of engine 11 is increased so that the frequency of generator 3 is as near as possible at the frequency of the system already in operation. Speed lever 18 may have its latch coupled to pin 18', so that the speeds of engines 9, 10, and 11 may be the same and be varied simultaneously.

Switch S is now closed to thus cause exciter Ex to produce its maximum voltage. The field windings of motor M and generators 1 and 2 are thus over-excited by a considerable amount. As soon as the over-excitation in the fields has built up, switch 26 is closed to connect generator 3 on the system as an induction motor. The machine, or generator, 3 thus operates as an induction motor on the low resistance damper winding 7, and the field winding short-circuited through resistor $R_3$. This causes a voltage dip on the system consisting of the generators 1 and 2 and motor M, all of which feed energy to the incoming machine. However, the dip in voltage is compensated by the previous over-excitation which elevated the bus voltage high enough above its normal value to thus amply make up for the dip caused by adding the generator 3. The stability of the system is thus maintained, and there is no loss of synchronism of any of the machines.

Under these mentioned conditions, the incoming generator, as 3, is very likely to pull into synchronism though its field is not excited. If it should not pull in, though still connected as an induction motor, its speed will in any event be very near at synchronous speed. Switch 22 is now closed to excite the field of generator 3 from the still over-excited exciter Ex, and generator 3 thus pulls into synchronism and it takes its share of the load.

The over-excitation of the machine is then removed by opening switch S, and the lever L may thereafter be adjusted to any speed desired. Generator 4 may be similarly added to the system.

This method has the advantage that even momentary reduction of the driving torque applied to the propeller is not required when adding an additional generator.

In Fig. 2, I show equipment for use for a third method of adding idle generators to a ship propulsion system already using one or more generators to energize a propulsion motor. In this modification, all the parts or elements that are the same as those shown in Fig. 1 are given the same reference numerals.

Assuming that generators 1, 2, and 3 are already in use and generator 4 is to be added. By this procedure, the field switch FS is first opened, thereby disconnecting the fields of all those generators that are in use and also the motor M from the exciter and connecting them to resistor R. The engine governors prevent the engines from over-speeding. As soon as the field current has decayed to a low value and the voltage is thus low, the switch 27 is closed to connect generator 4 to the buses interconnecting the machines in use.

Since the field excitation is removed, no material driving torque is transmitted to the motor M, and the motor thus in the meantime has decreased its speed to be just driven by the propeller P operated by the forward movement of the ship. The speed of all engines is reduced so that the generator and motor frequencies match approximately. The switch FS is then again closed, and all machines pull into synchronism as the flux in the field windings builds up.

The showing herein made is merely by way of example, because I am, of course, aware that others may devise still other similar schemes after having had the benefit of my teachings. I do not wish to be limited to the exact showing made, but wish to be limited only by the scope of the appended claims.

I claim as my invention:

1. In an electric ship propulsion system including a synchronous motor coupled to drive a ship propeller, in combination, an alternator of lesser full load capacity than the full load capacity of the synchronous motor, provided with a field winding and discharge resistor therefor, a stator winding, and a relatively heavy low-resistance damper winding so designed that the alternator may, when desired, be started with high pull-in torque as an induction motor while the field is also short circuited through its discharge resistor and then synchronized as a conventional synchronous motor, said alternator being connected to the synchronous motor to operate it, a prime mover for operating the alternator, means for varying the speed of the prime mover, a second alternator similar to the first, a prime mover for operating the second alternator, and means for adjusting the speed of the second prime mover, means acting on the speed adjusting means of both prime movers for simultaneously adjusting the speed of both prime movers to such same value that substantially no power is transmitted from the first alternator to the synchronous motor and the ship propeller operates the synchronous motor as an alternator, means for connecting the second alternator to the first alternator and the synchronous motor, operating as an alternator so that the second alternator operates as an induction motor on its damper winding and short circuited field winding whereby said second alternator is caused to operate at substantially synchronous speed, means, operable after the inrush current has decayed sufficiently, for exciting the field winding of the second alternator with direct current whereby said second alternator synchronizes, whereupon said means for adjusting the speed of both prime movers may be adjusted so that both of said alternators supply energy to said synchronous motor.

2. In an electric ship propulsion system including a propeller, a synchronous motor for driving the propeller, a plurality of generators for supplying energy, either singly or in combination, to the synchronous motor, a prime mover for each generator, and means for adjusting the speed of each prime mover, in combination, means for connecting a certain number of generators to operate said synchronous motor, control means for simultaneously adjusting the prime mover speeds of the generators connected to the synchronous motor to such equal speeds that substantially no energy is transmitted from the generators connected to the synchronous motor and the synchronous motor operates substantially idly as a generator driven by the ship propeller, means for adjusting the speed of the prime mover of a generator not yet included in the group of the said certain number of generators connected to the synchronous motor to a speed substantially equal to the speed adjustment of the prime movers for the said certain number of connected generators and interconnecting the speed adjusting means of the prime mover of the generator not yet connected to the synchronous motor to said control means, means for connecting the generator to be added to the synchronous motor and the generators already connected to the synchronous motor to operate the same as an induction motor, and means, operable after the initial current surge in the system by the connection of the generator thus added to the system has decayed to a given value, for exciting the added generator with direct current to thus synchronize it as a synchronous motor.

3. In an electric ship propulsion system including a propeller, a synchronous motor for driving the propeller, a plurality of generators for supplying energy, either singly or in combination, to the synchronous motor, a prime mover for each generator, and means for adjusting the speed of each prime mover, in combination, means for adding one additional generator to the system where several generators are already operating at the same speed and supplying energy to the synchronous motor, means for adjusting the speed of the prime mover of the generator to be added to substantially that of the prime movers already in operation, control means for simultaneously varying the speed of the prime movers already in operation and the prime mover of the generator to be added to such an equal lower speed that the generators already in operation transmit substantially no energy to the synchronous motor and the propeller operates the synchronous motor as a generator at no load, means operable while the synchronous motor is thus operating as a generator at no load, to connect the generator to be added to the system to thus operate as an induction motor, and means for exciting the generator to be added to the system with direct current to synchronize it with the system as a synchronous motor, whereupon said control means may be operated to speed up all the generators now connected to the system to supply energy to the synchronous motor.

4. In a ship propulsion system including a propeller, a source of alternating current energy and a synchronous motor for driving the said propeller while connected to said source of alternating current supplying energy of a given frequency to said synchronous motor, in combination, means for decreasing the frequency of the source of alternating current just sufficient that the synchronous motor is driven by the propeller at no load as an alternating current generator, an alternating current generator, control means for operating the alternating current generator while unexcited with direct current at substantially the frequency of the synchronous motor while operating at no load as an alternating current generator, means for connecting the alternating current generator, while thus unexcited, to the source of alternating current to thus operate it as an induction motor, and means, operable after the current surges occasioned by the connection of the alternating current generator to the source of alternating current energy, for exciting the alternating current generator with direct current to synchronize it as a synchronous motor.

5. In a system of control for a power system including, in combination, a source of alternating current energy comprising an alternator, means for varying the speed of said alternator to thus vary the frequency of said source, an inertia load, a motor mechanically coupled to said inertia load and electrically connected to said source of alternating current to thus drive said inertia load, a second alternator disposed to be connected to said source of alternating current, means for varying the speed and thus the frequency of the source of alternating current of said second alternator, means for increasing the stability of the system, and means for connecting said second alternator to the system while the stability is thus increased whereby the combined capacity of the first source of alternating current and the synchronous motor forces rapid synchronization of the second alternator thus connected to the system.

6. In a system of control for a power system including a source of supply of alternating current comprising one or more alternators, a synchronous motor having a large power capacity relative to the power capacity of the source of supply connected to said source of supply, an inertia load mechanically coupled to the synchronous motor to be driven thereby, in combination with, an additional alternator of substantially conventional design disposed to be connected to the power system to enhance the power capacity of the power system, means for varying the frequency of the supply of alternating current, means operable to increase the stability of the power system by over-exciting the alternator or alternators, as the case may be, already connected as part of the system and the synchronous motor, and means for connecting said additional alternator to the system while the stability of the system is thus increased whereby the combined capacity of the source of alternating current and the synchronous motor operating as a generator forces rapid synchronization of the said additional alternator thus connected to the system.

7. In a control for a ship propulsion system, in combination, a source of alternating current comprising one or more conventional alternators, a synchronous motor connected thereto, excitation control means for over-exciting the source of alternating current and the synchronous motor, a ship propeller coupled to the synchronous motor to be normally driven by said motor, the power capacity of said synchronous motor being large relative to the individual power capacity of the alternators of said source of alternating current, an additional alternating current generator, or alternator, of substantially conventional design disposed to be connected to the source of supply and the synchronous motor to thus aid in the propulsion of the ship, means for varying the frequency of the alternating current of the said source of alternating current, means for connecting the armature winding of the said additional alternator to the synchronous motor and the said source, said excitation control means being operable before the said last named means is operated to over-excite the said source and the synchronous motor when the last named means is operated, whereby the combined capacity of said source and said synchronous motor forces rapid speed stabilization of said additional alternator operating as an induction motor, and means for over-exciting said additional alternator to thus synchronize said alternator as a synchronous motor.

8. In a control for a ship propulsion system, in combination, a source of alternating current comprising one or more conventional alternators, a synchronous motor connected thereto, excitation control means for over-exciting the source of alternating current and the synchronous motor, a ship propeller coupled to the synchronous motor to be normally driven by said motor, the power capacity of said synchronous motor being large relative to the individual power capacity of the alternators of said source of alternating current, an additional alternating current generator, or alternator, of substantially conventional design disposed to be connected to the source of supply and to the synchronous motor to thus aid in the propulsion of the ship, means for varying the frequency of the alternating current of the said source of alternating current, means for connecting the armature winding of the said additional alternator to the synchronous motor and the said source, said excitation control means being operable at an instant before the said last named means is operated to thus over-excite the said source and the synchronous motor when the last named means is operated, whereby the combined capacity of said source and said synchronous motor forces rapid speed stabilization of said additional alternator operating as an induction motor, means for over-exciting said additional alternator to thus synchronize said additional alternator as a synchronous motor, and means for simultaneously increasing the frequency of the said source and said additional alternator to thus operate said synchronous motor to drive the ship propeller.

9. In a control for a power system including a source of alternating current energy, comprising an alternator of conventional design, an inertia load, a synchronous motor mechanically coupled to said inertia load, an additional alternator of substantially conventional design disposed to be connected to the system, a source of direct current for exciting said source, said synchronous motor and said additional alternator during normal operation, switching means for disconnecting said source of direct current from said source and said synchronous motor when said additional alternator is to be connected to the system, switching means operable when the field currents of the said source and said synchronous motor have decayed to a low value for connecting the armature winding of said additional alternator to the system, said switching means being operable as soon as the said additional alternator is operating substantially in synchronism with said source and synchronous motor for exciting the additional alternator, the synchronous motor and the said source.

10. In an electric ship propulsion system including an electric motor coupled to drive a ship propeller, in combination, an alternator of lesser full load capacity than the full load capacity of the motor, provided with a field winding and discharge resistor therefor, a stator winding, and a relatively heavy low-resistance damper winding so designed that the alternator may, when desired, be started with high pull-in torque as an induction motor while the field is also short circuited through its discharge resistor and then synchronized as a conventional synchronous motor, said alternator being connected to the motor to operate it, a prime mover for operating the alternator, means for varying the speed of the prime mover, a second alternator similar to the first, a prime mover for operating the second alternator, and means for adjusting the speed of the second prime mover, means acting on the speed adjusting means of both prime movers for simultaneously adjusting the speed of both prime movers to such same value that substantially no power is transmitted from the first alternator to the motor and the ship propeller operates the motor as a generator, means for connecting the second alternator to the first alternator and the motor, operating as a generator, so that the second alternator operates as an induction motor on its damper winding and short circuited field winding whereby said second alternator is caused to operate at substantially synchronous speed, means, operable after the inrush current has decayed sufficiently, for exciting the field winding of the second alternator with direct current whereby said second alternator synchronizes, whereupon said means for adjusting the speed of both prime movers may be adjusted so that both of said alternators supply energy to said electric motor.

11. In an electric ship propulsion system including a propeller, an electric motor for driving the propeller, a plurality of generators for supplying energy, either singly or in combination, to the said electric motor, a prime mover for each generator, and means for adjusting the speed of each prime mover, in combination, means for connecting a certain number of generators to operate said electric motor, control means for simultaneously adjusting the prime mover speeds of the generators connected to the said electric motor to such equal speeds that substantially no energy is transmitted from the generators connected to the electric motor and the electric motor operates substantially idly as a generator driven by the ship propeller, means for adjusting the speed of the prime mover of a generator not yet included in the group of the said certain number of generators connected to the electric motor to a speed substantially equal to the speed adjustment of the prime movers for the said certain number of connected generators and interconnecting the speed adjusting means of the prime mover of the generator not yet connected to the electric motor to said control means, means for connecting the generator to be added to the electric motor and the generators already connected to the electric motor to operate the same as an induction motor, and means, operable after the initial current surge in the system by the connection of the generator thus added to the system has decayed to a given value, for exciting the added generator with direct current to thus synchronize it as a synchronous motor.

12. In an electric ship propulsion system including a propeller, an electric motor for driving the propeller, a plurality of generators for supplying energy, either singly or in combination, to the electric motor, a prime mover for each generator, and means for adjusting the speed of each prime mover, in combination, means for adding one additional generator to the system where several generators are already operating at the same speed and supplying energy to the electric motor, means for adjusting the speed of the prime mover of the generator to be added to substantially that of the prime movers already in operation, control means for simultaneously varying the speed of the prime movers already in operation and the prime mover of the generator to be added to such an equal lower speed that the generators already in operation transmit substantially no energy to the electric motor and the propeller operates the electric motor as a generator at no load, means, operable while the electric motor is thus operating as a generator at no load, to connect the generator to be added to the system to thus operate as an induction motor, and means for exciting the generator to be added to the system with direct current to synchronize it with the system as a synchronous motor, whereupon said control means may be operated to speed up all the generators now connected to the system to supply energy to the electric motor.

13. In a ship propulsion system including a propeller, a source of alternating current energy and an electric motor for driving the said propeller while connected to said source of alternating current supplying energy of a given frequency to said electric motor, in combination, means for decreasing the frequency of the source of alternating current just sufficient that the electric motor is driven by the propeller at no load as an alternating current generator, an alternating current generator, control means for operating the alternating current generator while unexcited with direct current at substantially the frequency of the electric motor while operating at no load as an alternating current generator, means for connecting the alternating current generator, while thus unexcited, to the source of alternating current to thus operate it as an induction motor, and means, operable after the current surges occasioned by the connection of the alternating current generator to the source of alternating current energy, for exciting the alternating current generator with direct current to synchronize it as a synchronous motor.

14. In a control for a ship propulsion system, in combination, a source of alternating current comprising one or more conventional alternators, a motor connected thereto, excitation control means for over-exciting the source of alternating current, a ship propeller coupled to the motor to be normally driven by said motor, the power capacity of said motor being large relative to the individual power capacity of the alternators of said source of alternating current, an additional alternating current generator, or alternator, of substantially conventional design disposed to be connected to the source of supply and to the motor to thus aid in the propulsion of the ship, means for varying the frequency of the alternating current of the said source of alternating current, means for connecting the armature winding of the said additional alternator to the motor and the said source, said excitation control means being operable before the said last named means is operated to over-excite the said source when the last named means is operated, whereby the combined capacity of said source and said motor forces rapid speed stabilization of said additional alternator operating as an induction motor, and means for over-exciting said additional alternator to thus synchronize said additional alternator as a synchronous motor.

15. In a control for a ship propulsion system, in combination, a source of alternating current comprising one or more conventional alternators, a motor connected thereto, excitation control means for over-exciting the source of alternating current, a ship propeller coupled to the motor to be normally driven by said motor, the power capacity of said motor being large relative to the individual power capacity of the alternators of said source of alternating current, an additional alternating current generator, or alternator, of substantially conventional design disposed to be connected to the source of supply and to the motor to thus aid in the propulsion of the ship, means for varying the frequency of the alternating current of the said source of alternating current, means for connecting the armature winding of the said additional alternator to the motor and the said source, said excitation control means being operable at an instant before the said last named means is operated to thus over-excite the said source when the last named means is operated, whereby the combined capacity of said source and said motor forces rapid speed stabilization of said additional alternator operating as an induction motor, means for over-exciting said additional alternator to thus synchronize said additional alternator as a synchronous motor, and means for simultaneously increasing the frequency of the said source and an additional alternator to thus operate said synchronous motor to drive the ship propeller.

16. In a control for a power system including, in combination, a source of alternating current energy comprising at least one alternator, an inertia load, a motor mechanically coupled to said inertia load, a second alternator of substantially conventional design disposed to be connected to the system, a source of direct current for exciting said alternators during normal operation, switching means for disconnecting said source of direct current from said first alternator when said second alternator is to be connected to the system, switching means operable when the field current of the said first alternator has decayed to a low value for connecting the armature winding of said second alternator to the system, said switching means being operable as soon as the said second alternator is operating substantially in synchronism with said first alternator and said motor for exciting the alternators.

17. In a control for a ship propulsion system including a source of alternating current energy comprising one or more conventional alternators, an inertia load, a motor mechanically coupled to said inertia load, an additional alternator of substantially conventional design disposed to be connected to the motor, a source of direct current for exciting the alternators of said source and said additional alternator during normal operation, switching means for disconnecting operation, switching means for disconnecting said source of direct current from the alternators of said source just before said additional alternator is to be connected to said motor and is itself not yet excited with direct current, means for decreasing the frequency of the said source of alternating current by an amount just sufficient that said motor operates at no load and thus is driven by the ship propeller as a generator, means for matching the speed of the additional alternator to be added to match the reduced frequency of the supply, switching means operable when the field currents of the alternators of said source have decayed to a relatively low value for connecting the armature winding of the said additional alternator to the said motor, said switching means for exciting the alternators of said source of alternating current and the additional alternator being operable by the excitation provided to synchronize the motor, the additional alternator and alternators of said source of alternating current.

18. In a control for a ship propulsion system including a source of alternating current energy comprising one or more conventional alternators, an inertia load, as the propeller and ship, a synchronous motor mechanically coupled to said inertia load, an additional alternator of substantially conventional design disposed to be connected to the synchronous motor, a source of direct current for exciting said source, said synchronous motor, and said additional alternator during normal operation, switching means for disconnecting said source of direct current from said source and said synchronous motor, just before said additional alternator is to be connected to said synchronous motor and is itself not yet excited with direct current, means for decreasing the frequency of the said source of alternating current by an amount just sufficient that said synchronous motor operates at no load and thus is driven by the ship propeller as a generator, means for matching the speed of the additional alternator to be added to match the reduced frequency of the supply, switching means operable when the field currents of said source and said synchronous motor have decayed to a relatively low value for connecting the armature winding of the said additional alternator to the said synchronous motor, said switching means for exciting the source of alternating current and the additional alternator being operable by the excitation currents thus provided to synchronize the synchronous motor, additional alternator and source of alternating current.

ERNEST I. POLLARD.